(12) United States Patent
Hashimoto

(10) Patent No.: US 11,251,030 B2
(45) Date of Patent: Feb. 15, 2022

(54) MASS SPECTROMETRY APPARATUS AND MASS SPECTROMETRY METHOD

(71) Applicant: Hitachi High-Tech Corporation, Tokyo (JP)

(72) Inventor: Yuichiro Hashimoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 17/266,367

(22) PCT Filed: Jul. 24, 2019

(86) PCT No.: PCT/JP2019/029084
§ 371 (c)(1),
(2) Date: Feb. 5, 2021

(87) PCT Pub. No.: WO2020/031703
PCT Pub. Date: Feb. 13, 2020

(65) Prior Publication Data
US 2021/0313159 A1 Oct. 7, 2021

(30) Foreign Application Priority Data
Aug. 7, 2018 (JP) .............................. JP2018-148795

(51) Int. Cl.
*H01J 49/00* (2006.01)
*H01J 49/10* (2006.01)
*G01N 30/72* (2006.01)

(52) U.S. Cl.
CPC ...... *H01J 49/0036* (2013.01); *G01N 30/7233* (2013.01); *H01J 49/10* (2013.01)

(58) Field of Classification Search
CPC ... H01J 49/0036; H01J 49/10; G01N 30/7233
(Continued)

(56) References Cited

U.S. PATENT DOCUMENTS 6,452,166 B1 9/2002 Enke et al.
8,941,060 B2 1/2015 Satake et al.
(Continued)

FOREIGN PATENT DOCUMENTS

JP 2003-172726 A 6/2003
JP 2008-262922 A 10/2008
JP 2012-199027 A 10/2012

OTHER PUBLICATIONS

International Search Report (PCT/ISA/210) issued in PCT Application No. PCT/JP2019/029084 dated Sep. 17, 2019 with English translation (two (2) pages).
(Continued)

*Primary Examiner* — Michael Maskell
(74) *Attorney, Agent, or Firm* — Crowell & Moring LLP

(57) ABSTRACT

An object of the invention is to provide a mass spectrometry apparatus capable of obtaining a highly accurate quantitative result and being low-cost. A small section measurement instruction unit 101 instructs a detector 9 to perform measurement on a plurality of small sections 5 in a channel 4, the signals detected by the detector 9 are stored in a data storage unit 102, the signals are integrated by a small section signal amount integration unit 103, and variance of the integrated signals is calculated by a signal variance calculation unit 104. A signal variance evaluation unit 105 evaluates the signal variance of signals of each small section 5 in the same channel 4. When the signal variance is evaluated to be stable, an operation control unit 106 controls operations of the ion source 6 to continue measurement without warning. When the signal variance is evaluated to be unstable, the warning is performed during the measurement or after the measurement.

12 Claims, 4 Drawing Sheets

(58) Field of Classification Search
USPC .......................................... 250/281, 282, 288
See application file for complete search history.

(56) References Cited

U.S. PATENT DOCUMENTS

2005/0072915 A1   4/2005  Stults et al.
2015/0206728 A1*  7/2015  Kaneko ............... H01J 49/0036
                                                              250/282

OTHER PUBLICATIONS

Japanese-language Written Opinion (PCT/ISA/237) issued in PCT Application No. PCT/JP2019/029084 dated Sep. 17, 2019 (three (3) pages).
Johnson et al., "Tandem-in-Space and Tandem-in-Time Mass Spectrometry: Triple Quadrupoles and Quadrupole Ion Traps", Anal. Chem. 1990, pp. 2162-2172, vol. 62., (11 pages).
International Preliminary Report on Patentability (PCT/IB/338 & PCT/IB/373) issued in PCT Application No. PCT/JP2019/029084 dated Feb. 18, 2021, including English translation of document (Japanese-language Written Opinion (PCT/ISA/237), filed on Feb. 5, 2021) (six (6) pages).

* cited by examiner

[FIG. 1]
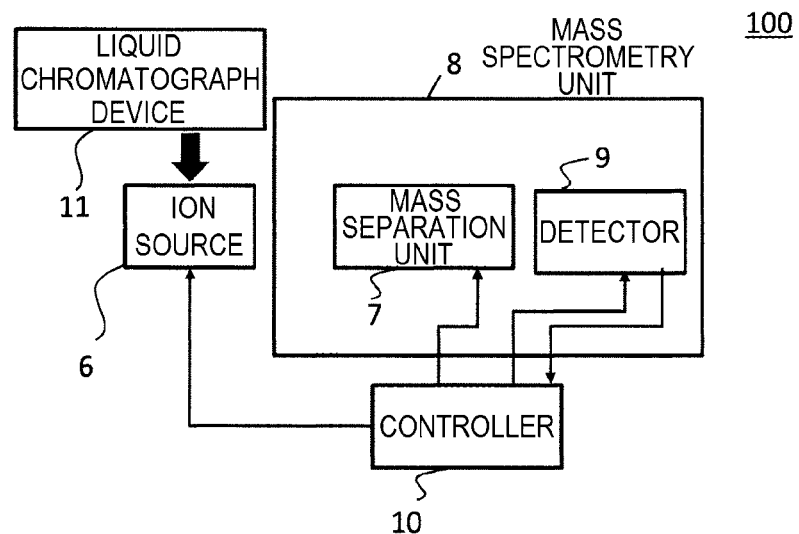
[FIG. 2]
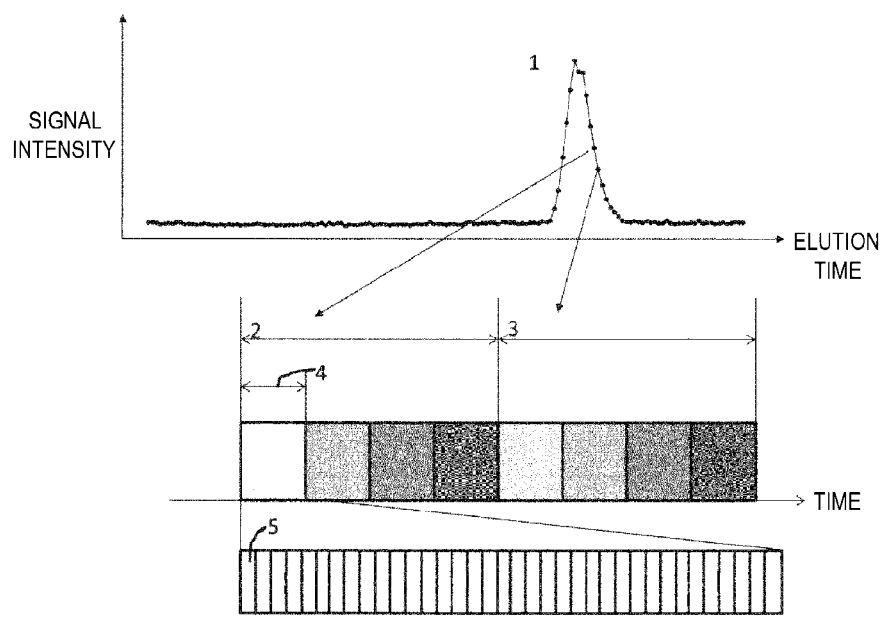

[FIG. 3]
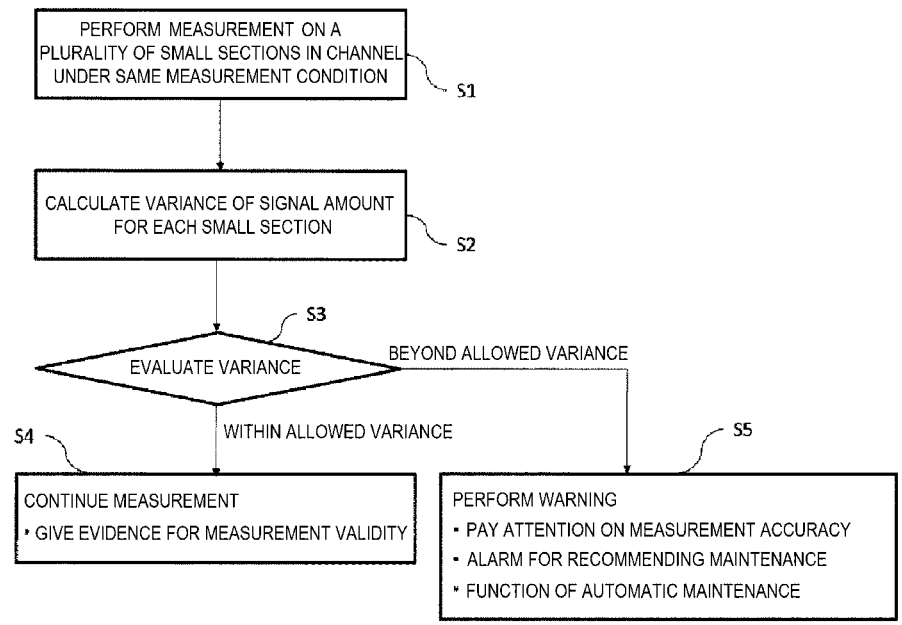
[FIG. 4]
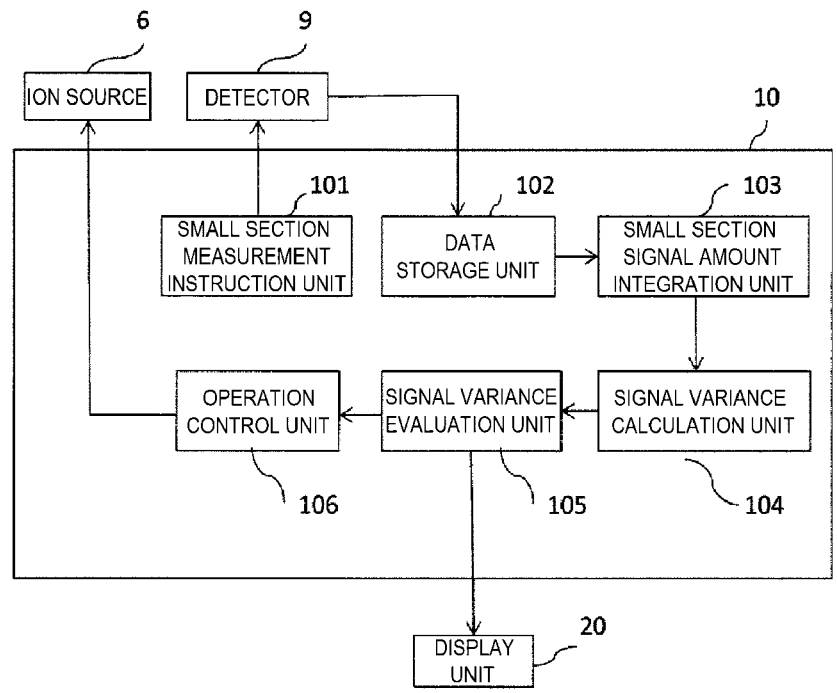

[FIG. 5]
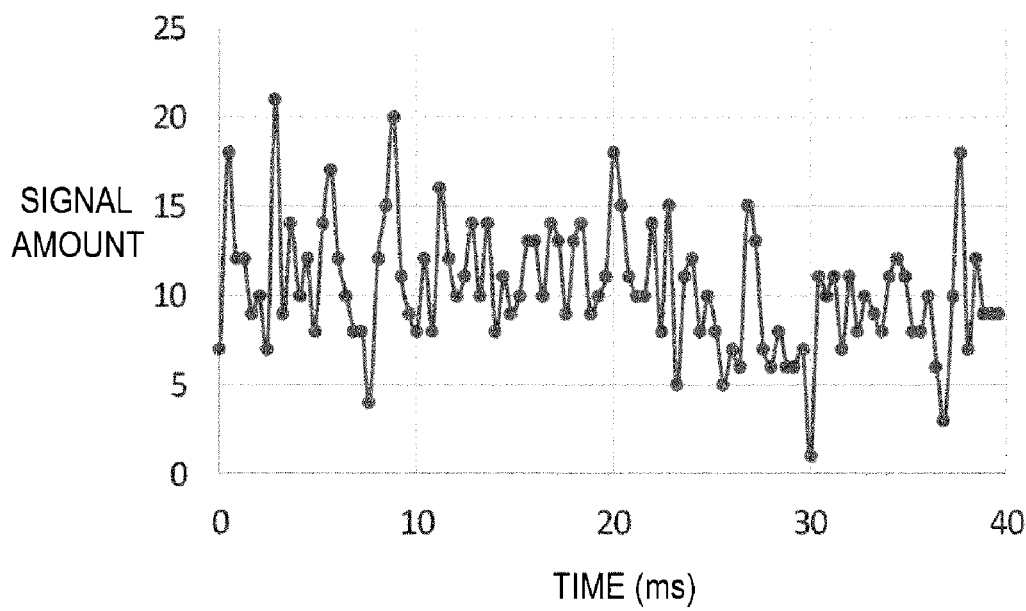
[FIG. 6]
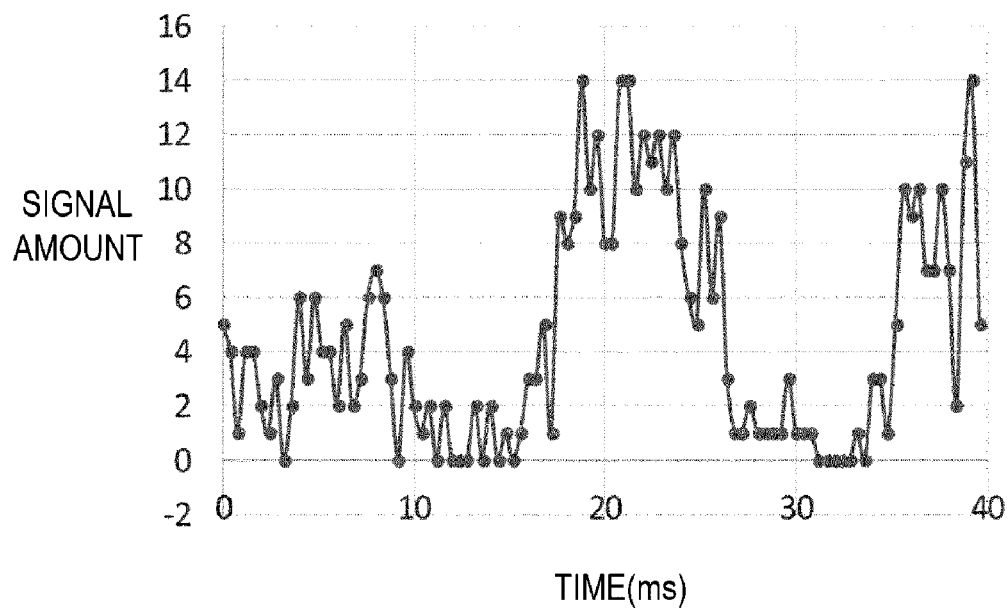

[FIG. 7]
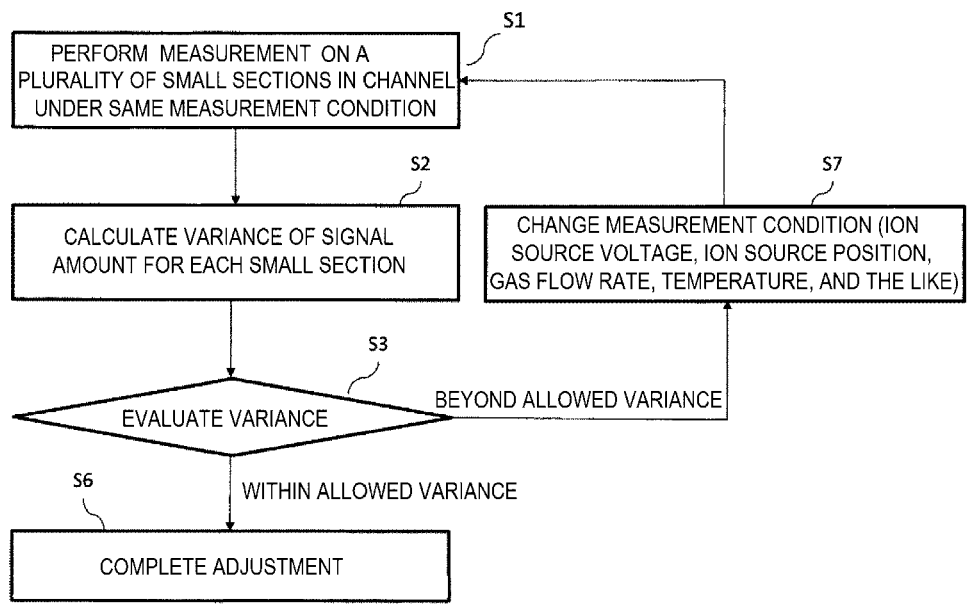

MASS SPECTROMETRY APPARATUS AND MASS SPECTROMETRY METHOD

TECHNICAL FIELD

The present invention relates to a mass spectrometry apparatus and a mass spectrometry method in combination with a chromatograph such as a gas chromatograph mass spectrometry apparatus (GC/MS) and a liquid chromatograph mass spectrometry apparatus (LC/MS).

BACKGROUND ART

As one method of mass spectrometry, a method called MS/MS analysis (tandem analysis) is widely used. A mass spectrometry apparatus for performing the MS/MS analysis has various configurations, and includes a triple quadrupole mass spectrometry apparatus which has a relatively simple device structure and is easy to operate.

PTL 1 and Non-PTL 1 disclose configurations of common triple quadrupole mass spectrometry apparatuses and operation methods thereof. Ions derived from sample components generated by an ion source are introduced into a pre-stage quadrupole mass filter (Q1), and ions having a specific mass-to-charge ratio (m/z) are selected as precursor ions. The precursor ions are introduced into a collision cell (Q2). Nitrogen gas and the like are supplied into the collision cell, and the precursor ions collide with the gas in the collision cell to dissociate (CID), and product ions are generated. The product ions are mass filtered by a post-stage quadrupole mass filter (Q3) and reach a detector for detection.

The triple quadrupole mass spectrometry apparatus as described above may be used alone, but is often used in combination with a chromatograph such as a gas chromatograph (GC) or a liquid chromatograph (LC).

The MS/MS analysis in the triple quadrupole mass spectrometry apparatus includes measurement modes such as a multiple reaction monitoring (MRM) measurement mode, a selected ion monitoring (SIM) measurement mode, a precursor ion scan measurement mode, a product ion scan measurement mode, and a neutral loss scan measurement mode.

In the triple quadrupole mass spectrometry apparatus, since various components in a sample are separated in time in the chromatograph, ion intensity signals derived from different compounds can be obtained by executing the SIM measurement mode or the MRM measurement mode for ions having different mass-to-charge ratios one after another while sequentially switching between the SIM measurement mode and the MRM measurement mode. In particular, for a measurement whose quantitative accuracy is required, a method is generally used of increasing the quantitative accuracy by performing the MRM measurement corresponding to each of a compound to be measured and a similar compound (isotope and the like) having a known concentration and then performing correction.

When these measurements are performed, in the mass spectrometry apparatus, signal intensity may become unstable due to unstable ionization, contamination of a voltage electrode of the mass spectrometry apparatus, or unstable applied voltage.

When the signal intensity becomes unstable, a correct result cannot be obtained using the mass spectrometry apparatus. Therefore, it is important to prevent inaccurate measurement by preventing the incorrect result from occurring or by promptly monitoring and giving a warning when the incorrect result occurs.

In particular, unstable ionization is not as easy to monitor as the applied voltage, and therefore current monitoring and current stabilization of the ion source are being studied.

PTL 2 discloses that a stable atmospheric pressure chemical ion source can be implemented by monitoring a discharge current of corona discharge used for ionizing an atmospheric pressure chemical ion source and changing an applied voltage so as to keep a current constant.

PTL 3 discloses that a stable electrospray ion source is implemented by monitoring a probe current used for ionizing the electrospray ion source and changing a probe applied voltage so as to keep a current constant.

However, it is known that an ion source for liquid has an ionization efficiency that changes depending on spray states of liquid sample spray, and even when the discharge current or the probe current is monitored and stabilized, a stable signal intensity may not be obtained.

PTL 4 discloses a method of monitoring a spray state in addition to the probe current of the electrospray ion source and controlling a probe position and a probe applied voltage to return to a normal state.

Further, a method of controlling a position and an applied voltage of an ion source by using a known sample such as a calibration sample is described, such that a preset signal intensity can be obtained.

CITATION LIST

Patent Literature

PTL 1: JP-A-2003-172726
PTL 2: JP-A-2008-262922
PTL 3: U.S. Pat. No. 6452166
PTL 4: US Application Publication No. 20050072915

Non-Patent Literature

Non-PTL 1: Anal. Chem. 1990, 62. 2162-2172 Tandem-in-Space and Tandem-in-Time Mass Spectrometry: Triple Quadrupoles and Quadrupole Ion Traps Jodie V. Johnson and Richard A. Yost*

SUMMARY OF INVENTION

Technical Problem

However, measurement of a current value of the ion source and observation of the spray state which have been used as a monitoring method for the ion source stabilization in the related art have a low correlation with the actually obtained signal intensity. Therefore, in a mass spectrometry unit, when the ion source became unstable due to contamination of an ionization probe, a correct quantitative result cannot be obtained, and high quantitative accuracy cannot be obtained.

In the related art, a current measurement device and a CCD device for spray measurement are required, which requires cost.

Further, in order to improve the correlation with the signal intensity, when the measurement using the known sample such as the calibration sample is performed, there are problems such as that a special sample introduction unit is necessary, and a schedule limitation is added to normal measurement for measurement of a known concentration sample.

An object of the invention is to implement a mass spectrometry apparatus and a mass spectrometry method capable of obtaining a highly accurate quantitative result and being low-cost.

Solution to Problem

In order to achieve the above object, the invention is configured as follows.

A mass spectrometry apparatus includes an ion source configured to ionize a measurement sample that is sent from a chromatograph device, a mass spectrometry unit including a detector configured to detections generated by the ion source so as to perform mass spectrometry, and a controller configured to acquire a plurality of pieces of data including elution time and signal intensity using the ions analyzed by the mass spectrometry unit. The controller is configured to divide the plurality of pieces of data into a plurality of channels, divide each of the plurality of channels into a plurality of small sections, control the detector so as to detect data of each of the plurality of small sections obtained by dividing, and determine whether the ion source is stable or unstable based on the data of the plurality of small sections obtained by dividing.

A mass spectrometry method includes performing mass spectrometry by detecting ions generated by an ion source configured to ionize a measurement sample that is sent from a chromatograph device, and acquiring a plurality of pieces of data including elution time and signal intensity using the analyzed ions. The plurality of pieces of data is divided into a plurality of channels, each of the plurality of channels is divided into a plurality of small sections, data of each of the plurality of small sections obtained by dividing is detected, and whether the ion source is stable or unstable is determined based on the data of the plurality of small sections obtained by dividing.

Advantageous Effect

According to the invention, it is possible to implement a mass spectrometry apparatus and a mass spectrometry method capable of obtaining a highly accurate quantitative result and being low-cost.

BRIEF DESCRIPTION OF DRAWINGS

FIG. 1 is a diagram illustrating a schematic configuration of a liquid chromatograph mass spectrometry apparatus.

FIG. 2 is an illustrative diagram illustrating a data configuration in the liquid chromatograph mass spectrometry apparatus which is a first embodiment of the invention.

FIG. 3 is a flow chart of operations of the first embodiment.

FIG. 4 is an internal functional block diagram of a controller in the first embodiment.

FIG. 5 is a graph illustrating an example of signals in a small section obtained in a cycle around a chromatography peak.

FIG. 6 is a graph illustrating another example of the signals in the small section obtained in the cycle around the chromatography peak.

FIG. 7 is a flow chart of operations of a second embodiment.

DESCRIPTION OF EMBODIMENTS

Embodiments of the invention will be described with reference to the attached drawings.

Embodiments

First Embodiment

Hereinafter, an embodiment in which the invention is applied to a liquid chromatograph mass spectrometry apparatus will be described.

FIG. 1 is a diagram illustrating a schematic configuration of a liquid chromatograph mass spectrometry apparatus 100.

In FIG. 1, the liquid chromatograph mass spectrometry apparatus 100 includes a liquid chromatograph device 11, an ion source 6, a mass spectrometry unit 8, and a controller 10. The mass spectrometry unit 8 includes a mass separation unit 7 and a detector 9.

In the liquid chromatograph mass spectrometry apparatus 100, a solution (measurement sample) sent from the liquid chromatograph device 11 is ionized by the ion source 6 such as an electrospray ion source or an atmospheric pressure chemical ion source.

Ions generated by the ion source 6 are introduced into the mass spectrometry unit 8 in vacuum, separated by various mass separation units 7 such as a quadrupole type, a time-of-flight type, and a magnetic field type, and detected as a signal by the detector 9. The signal detected by the detector 9 is processed by the controller 10, and a plurality of pieces of data including elution time and signal intensity is created using the ions analyzed by the mass spectrometry unit 8, and the created data is divided into a plurality of channels.

The controller 10 can control the ion source 6, the mass separation unit 7, the detector 9, and the like in addition to the signal processing.

FIG. 2 is an illustrative diagram illustrating a data configuration in the liquid chromatograph mass spectrometry apparatus 100 which is a first embodiment of the invention. An example illustrated in FIG. 2 illustrates a typical chromatogram obtained when the liquid chromatograph mass spectrometry apparatus 100 performs measurement.

In FIG. 2, the chromatogram shows a horizontal axis as the elution time indicating an elution timing of an LC and a GC, and a vertical axis represents a total value of the signal intensity.

In the example illustrated in FIG. 2, a chromatography peak 1 is detected. In an MRM measurement, the (m/z) to be measured and a measurement condition such as a lens voltage condition associated therewith are changed for each channel (also referred to as a segment) to perform the measurement. In each point of these signals, an integrated value of a signal amount of the measurement in the plurality of channels having different measurement methods is plotted.

Normally, a signal integration time of one channel 4 among the plurality of channels is set to about 1 to 100 ms. Further, the number of channels is set to about 1 to 100. One cycle of a channel set for which the measurement is performed once is called a cycle. One cycle is normally set to about 50 to 1000 ms. FIG. 2 illustrates an N-th cycle 2 and an (N+1)-th cycle 3 in an enlarged manner.

The above description is about a measurement method generally performed by the chromatograph mass spectrometry apparatus.

In the first embodiment of the invention, an inside of the channel 4 measured under the same measurement condition is divided into a plurality of small sections 5, and a measurement value is obtained in each of the plurality of small sections 5. The measurement conditions are the same in the small sections 5 of the same channel. A time of each small section 5 is typically about 10 to 1000 us. The signal amount (data amount) is integrated in these small sections 5 and a variation thereof is determined.

Indicators of the variation include a difference between a maximum value and a minimum value, a standard deviation, a kurtosis, and a skewness. By using these indicators, it is possible to determine whether the variation is significantly worse than a reference value obtained from statistical randomness or an empirical rule.

Accordingly, it is possible to determine whether ion generation is stably performed in the ion source 6.

FIG. 3 is a flow chart of operations in the first embodiment of the invention, and is an illustrative diagram of operations capable of guaranteeing measurement reliability and informing a user of a maintenance timing. Further, FIG. 4 is an internal functional block diagram of the controller 10 in the first embodiment.

In FIG. 4, the controller 10 includes a small section measurement instruction unit 101, a data storage unit 102, a small section signal amount integration unit 103, a signal variance calculation unit 104, a signal variance evaluation unit 105, and an operation control unit 106.

In FIGS. 3 and 4, the small section measurement instruction unit 101 commands the detector 9 and controls the detector 9 to detect the data for each of the plurality of small sections 5 in the channel 4 under the same measurement condition (step S1). Next, the signal detected by the detector 9 is stored in the data storage unit 102, the signal (data) stored in the data storage unit 102 is integrated by the small section signal amount integration unit 103, and a variation of the integrated signal is calculated by the signal variance calculation unit 104 (step S2).

Next, the signal variance evaluation unit 105 evaluates the signal variation of each small section 5 in the same channel 4 (step S3). The evaluation (determination) of the signal variation is performed to evaluate stability (determine whether the ion source 6 is stable or unstable) based on a predetermined variation evaluation method.

In step S3, when the ion source 6 is evaluated to be stable, the operation control unit 106 controls operations of the ion source 6 to continue the measurement without warning (step S4). As a result, the ion source 6 during the measurement is stable and a proof (evidence) of measurement validity is provided. The proof of measurement validity can be performed by instructing a display unit 20 from the signal variance evaluation unit 105 to indicate that the measurement is valid.

The display unit 20 is disposed separately from the controller 10 in the example illustrated in FIG. 4, but may also be integrated with the controller 10. Further, instead of the display unit 20, it is also possible to use a storage unit that stores that the measured signal is valid.

On the other hand, in step S3, when the ion source 6 is evaluated to be unstable, a warning is performed during the measurement or after the measurement (step S5).

A warning method includes a method of displaying on the display unit 20 to give caution about measurement accuracy, and a method of issuing an alarm to the user for maintenance recommendation. Alternatively, there is a method of activating an automatic maintenance function built in the liquid chromatograph mass spectrometry apparatus 100. Based on the alarm issued by the function according to the invention, one or more of these methods can be performed.

Next, in the present first embodiment, an example actually applied to the measurement will be described.

FIG. 5 is a graph illustrating signals in small sections obtained in a cycle around a chromatography peak when LC mass spectrometry of testosterone is performed. A channel measurement time in data illustrated in FIG. 5 is 40 ms, and a time width of each small section 5 is 0.4 ms. Further, a signal average value of the small sections 5 was 10.4, and the standard deviation, which is the indicator of the variation, was 3.5.

The signal average value and the standard deviation described above can be interpreted by a Poisson distribution observed when measuring a rare phenomenon. In the Poisson distribution, it is known that the standard deviation is a square root of N for an average value of N events.

The standard deviation expected from the average value 10.4 of the signal in the example illustrated in FIG. 5 is 3.2, and the obtained measurement value 3.5 is determined to be a normal state that is not considered to be a significant variation.

FIG. 6 is a graph illustrating another example of the signals in small sections obtained in a cycle around a chromatography peak. A channel measurement time in data illustrated in FIG. 6 is 40 ms, and a time width of the small section 5 is 0.4 ms.

It can be seen that the signal fluctuates significantly in the example illustrated in FIG. 6 as compared to the example illustrated in FIG. 5. The signal average value of the small sections 5 was 4.5, and the standard deviation, which is the indicator of the variation, was 4.1. The standard deviation expected from the average value 4.5 with the same estimation as the example illustrated in FIG. 5 is 2.1, whereas the standard deviation 4.1 of the obtained measurement value can be determined to be significantly large. From this result, it is possible to determine that the ion source 6 is unstable in the measurement illustrated in FIG. 6.

By applying the first embodiment of the invention to the liquid chromatograph mass spectrometry apparatus in this way, the mass spectrometry apparatus and the mass spectrometry method capable of obtaining a highly accurate quantitative result at a low cost can be implemented without using a special device. Further, an inexpensive and highly accurate device stability monitoring method can be provided, and feedback can be made to maintenance and optimization of the apparatus.

After the measurement of the small sections 5 is performed and the indicator and the total value of the variation are calculated (after the average value and the standard deviation of the data are calculated), each signal amount for each small section 5 may be deleted from a memory storage device (data storage unit 102) such as a hard disk.

Accordingly, the signal data stored for each small section 5 can be significantly reduced, and the invention can be implemented even with a small number of memory storage devices.

Second Embodiment

Next, a second embodiment of the invention will be described.

FIG. 7 is a flow chart of operations in the second embodiment of the invention, and is an illustrative diagram of operations capable of automatically adjusting the measurement conditions of the ion source 6.

The second embodiment is an example when applied to the liquid chromatograph mass spectrometry apparatus 100 as in the first embodiment. Since the schematic configuration of the liquid chromatograph mass spectrometry apparatus 100 and internal functional blocks of the controller 10 are the same as those illustrated in FIGS. 1 and 3, illustration and detailed description thereof will be omitted.

The measurement conditions (ion generation conditions) of the ion source 6 are determined by a voltage applied to the ion source 6, a gas flow rate used for spraying and heating, a temperature of the ion source 6, and the like. These parameter adjustments are usually performed by a user, but the parameter adjustments described above can be automated by using the second embodiment of the invention.

In FIGS. 7 and 4, the small section measurement instruction unit 101 commands the detector 9 to perform measurement in the plurality of small sections 5 in the channel 4 under the same measurement condition (step S1). Next, the signal detected by the detector 9 is stored in the data storage unit 102, the signal (data) stored in the data storage unit 102 is integrated by the small section signal amount integration unit 103, and a variation of the integrated signal is calculated by the signal variance calculation unit 104 (step S2).

Next, the signal variance evaluation unit 105 evaluates the signal variation of each small section 5 in the same channel 4 (step S3). The evaluation of the signal variation is performed to evaluate stability based on a predetermined variation evaluation method.

In step S3, when the signal variance evaluation unit 105 evaluates as stable, the adjustment is completed (adjustment completed (step S6)).

On the other hand, in step S3, when the signal variance evaluation unit 105 evaluates as unstable, the operation control unit 106 changes the conditions (ion generation conditions) such as the voltage applied to the ion source 6, a position, the gas flow rate used for spraying and heating, and the temperature of the ion source 6 (step S7), and performs the measurement again (step S1).

By repeatedly executing these processes (steps S1 to S3 and S7), it is possible to automatically set an optimum measurement condition (ion generation condition).

Further, even in the second embodiment, similar to the first embodiment, after the measurement of the small section 5 is performed and an indicator and a total value of the variation are calculated, each signal amount for each small section 5 may be deleted from a memory storage device (data storage unit 102) such as a hard disk so as to significantly reduce the data.

By applying the second embodiment of the invention to the liquid chromatograph mass spectrometry apparatus in this way, similar to the first embodiment, it is possible to implement a mass spectrometry apparatus and a mass spectrometry method capable of obtaining a highly accurate quantitative result and being low-cost without using a special device.

Further, according to the second embodiment, when the signal is unstable, the above-described parameter adjustment can be automatically performed and the optimum measurement condition can be automatically set.

By predetermining a voltage value to be adjusted (changed) according to the average value and the standard deviation of the measured signal in an experiment, the measurement conditions in step S7 can be executed accordingly.

The above-described example is an example in which the invention is applied to a liquid chromatograph mass spectrometry apparatus, but the invention can be applied not only to a liquid chromatograph mass spectrometry apparatus but also to a mass spectrometry apparatus and a mass spectrometry method in combination with a chromatograph device such as a gas chromatograph mass spectrometry apparatus.

In particular, it is suitable for a chromatograph mass spectrometry apparatus that performs measurement such as selective ion monitoring (SIM) measurement, multiplex reaction monitoring (MRM) measurement, and the like.

REFERENCE SIGN LIST

1: Chromatography peak
2: N-th cycle
3: (N+1)-th cycle
4: Channel
5: Small section
6: Ion source
7: Mass separation unit
8: Mass separation unit
9: Detector
10: Controller
11: Liquid chromatograph device
100: Liquid chromatograph mass spectrometry apparatus
101: Small section measurement instruction unit
102: Data storage unit
103: Small section signal amount integration unit
104: Signal variance calculation unit
105: Signal variance evaluation unit
106: Operation control unit

The invention claimed is:

1. A mass spectrometry apparatus comprising:
an ion source configured to ionize a measurement sample that is sent from a chromatograph device;
a mass spectrometry unit including a detector configured to detect ions generated by the ion source so as to perform mass spectrometry; and
a controller configured to acquire a plurality of pieces of data including elution time and signal intensity using the ions analyzed by the mass spectrometry unit, wherein
the controller is configured to divide the plurality of pieces of data into a plurality of channels, divide each of the plurality of channels into a plurality of small sections, control the detector so as to detect data of each of the plurality of small sections obtained by dividing, and determine whether the ion source is stable or unstable based on the data of the plurality of small sections obtained by dividing.

2. The mass spectrometry apparatus according to claim 1, wherein
the controller is configured to calculate an average value and a standard deviation of the data of the plurality of small sections, and determine whether the ion source is stable or unstable based on the average value and the standard deviation.

3. The mass spectrometry apparatus according to claim 2, further comprising:
a display unit, wherein
the controller is configured to control the display unit to display whether the ion source is stable or unstable.

4. The mass spectrometry apparatus according to claim 2, wherein
the controller is configured to change an ion generation condition of the ion source when it is determined that the ion source is unstable.

5. The mass spectrometry apparatus according to claim 3, wherein
the controller includes a data storage unit storing the data of the small sections, and is configured to delete the data of the small sections stored in the data storage unit after calculating the average value and the standard deviation of the data of the small sections.

6. The mass spectrometry apparatus according to claim 1, wherein
the chromatograph device is a liquid chromatograph device.

7. A mass spectrometry method comprising:
performing mass spectrometry by detecting ions generated by an ion source configured to ionize a measurement sample that is sent from a chromatograph device; and
acquiring a plurality of pieces of data including elution time and signal intensity using the analyzed ions, wherein
the plurality of pieces of data is divided into a plurality of channels, each of the plurality of channels is divided into a plurality of small sections, data of each of the plurality of small sections obtained by dividing is detected, and whether the ion source is stable or unstable is determined based on the data of the plurality of small sections obtained by dividing.

8. The mass spectrometry method according to claim 7, wherein
an average value and a standard deviation of the data of the plurality of small sections are calculated, and whether the ion source is stable or unstable is determined based on the average value and the standard deviation.

9. The mass spectrometry method according to claim 8, wherein
whether the ion source is stable or unstable is displayed by a display unit.

10. The mass spectrometry method according to claim 8, wherein
the controller is configured to change an ion generation condition of the ion source when it is determined that the ion source is unstable.

11. The mass spectrometry method according to claim 9, wherein
the data of the small sections is stored in a storage unit, and the data of the small sections stored in the data storage unit is deleted after the average value and the standard deviation of the data of the small sections are calculated.

12. The mass spectrometry method according to claim 7, wherein
the chromatograph device is a liquid chromatograph device.

\* \* \* \* \*